June 15, 1943.  J. H. HOPKINS ET AL  2,321,748
SEPARATION OF MIXTURES OF METHANOL AND BUTYRALDEHYDE
Filed May 4, 1940
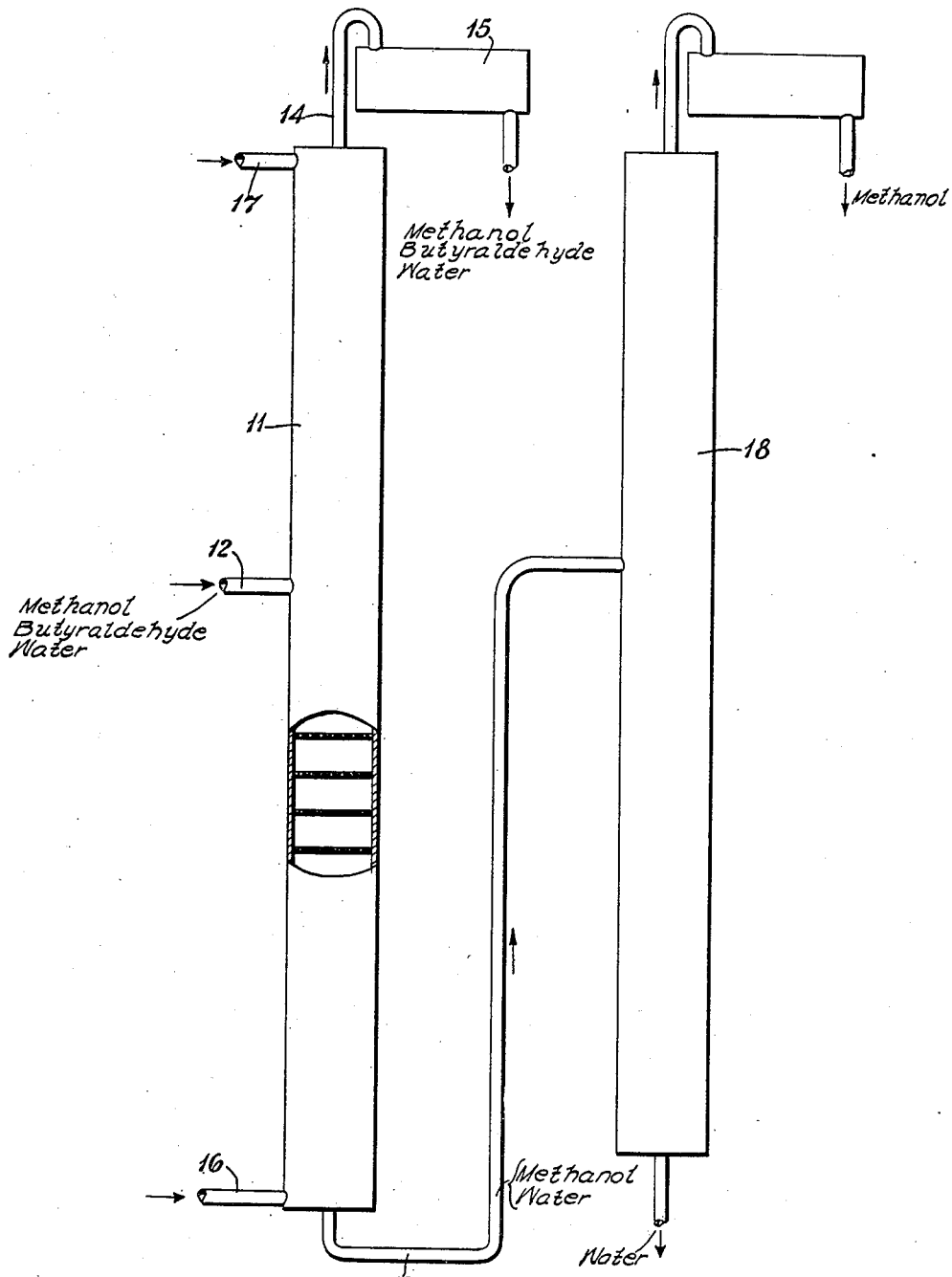
John H. Hopkins
Barnard M. Marks
INVENTORS
BY
J. M. Castle Jr.
ATTORNEY Patented June 15, 1943

2,321,748

UNITED STATES PATENT OFFICE 2,321,748

SEPARATION OF MIXTURES OF METHANOL AND BUTYRALDEHYDE

John H. Hopkins, Arlington, and Barnard M. Marks, Upper Montclair, N. J., assignors to E. I. du Pont de Nemours & Company, Wilmington, Del., a corporation of Delaware Application May 4, 1940, Serial No. 333,306

4 Claims. (Cl. 202—41)

This invention relates to the separation of mixtures of methanol and butyraldehyde and, more particularly, to the rectification of aqueous mixtures of methanol and butyraldehyde to recover a major part of the methanol substantially free from butyraldehyde and to recover the butyraldehyde in useful concentrations.

Although of general application to aqueous mixtures of methanol and butyraldehyde (either normal or iso-) regardless of their source, the present invention is particularly concerned with the treatment of aqueous mixtures derived as by-products from the manufacture of polyvinyl butyral resins. These mixtures usually contain water in major part, either iso- or normal butyraldehyde in small percentage, and methanol. The methanol content is not usually below 20% but may be as low as 10% or less before the cost of the process overbalances the value of the ingredients recovered.

The liquor obtained as a by-product from the manufacture of polyvinyl butyral resins would generally come within the following analysis:

| | Parts |
|---|---|
| Water | 80–40 |
| Methanol | 20–60 |
| Butyraldehyde | 0.01–0.6 |

All proportions given herein are by weight unless otherwise designated.

To reuse the methanol from mixtures such as herein considered, it must be recovered substantially free from contamination with the butyraldehyde. On the other hand, while the butyraldehyde should be recovered in useful concentrations, its recovery free of methanol is not ordinarily required. Hence, particularly for reuse in the manufacture of polyvinyl butyral resins, it is desired to recover from the aqueous mixtures a large part of the methanol substantially completely free of butyraldehyde. Also, it is desirable to recover the butyraldehyde.

An object of the present invention is to provide a practical process for recovering methanol, substantially uncontaminated with butyraldehyde, from aqueous mixtures of methanol and butyraldehyde. A further object is to recover the aldehyde in suitable concentration for reuse. A particular object of the present invention is to provide a process whereby the aqueous mixtures of methanol and butyraldehyde resulting as by-products in the manufacture of polyvinyl butyral resins may be separated for reuse in the manufacture of these polyvinyl butyral products. Other objects will be apparent from the descriptions of the invention given hereinafter.

The above objects are accomplished according to the present invention by introducing an aqueous mixture of methanol and butyraldehyde into a fractionating column, applying heat thereto to volatilize the mixture, and maintaining a water vapor concentration of at least about 7% by weight of the butyraldehyde vapor at the top of the column.

The problem attacked by the present invention is to cause all of the butyraldehyde of the herein considered mixtures to leave the fractionating column in the form of vapor so that the liquid tailings discharged from the bottom of the column will be substantially free from butyraldehyde. To obtain the tailings substantially free of the aldehyde is a positive requirement. Also, to obtain the aldehyde in a concentration suitable for reuse is highly desirable.

The present invention resides in the discovery that the butyraldehyde in these mixtures is discharged as vapor from the top of the fractionating column only when there is present at that point a minimum quantity of water vapor amounting to about 7% by weight of the amount of butyraldehyde vapor. Further, that, by maintaining a water-vapor concentration of at least about 7% by weight of the butyraldehyde vapor at the top of the column, the butyraldehyde is substantially completely eliminated from the liquid collecting at the bottom of the column. Still further, by keeping the water vapor above, but not substantially above, 7% by weight of the butyraldehyde vapor at the top of the column, for example, between about 7% and 15%, specifically, about 10%, a relatively small proportion of the methanol passes over as a vapor with the butyraldehyde and, hence, a large part of the methanol may be recovered free of aldehyde from the tailings.

As a possible explanation of this phenomenon, but in no respect as a limitation upon the scope or interpretation of the invention, the hypothesis is offered that the aldehyde in the mixture tends to be bound with methanol in the form of a hemiacetal; that this hemiacetal is not volatilized as such under the conditions of operation; that the equilibrium between hemiacetal, on the one hand, and the methanol and aldehyde, on the other hand, is moved in the direction of the latter by the presence of the water vapor provided at the top of the column in accordance with the invention, with the result that the vapors entering the condenser are made up of methanol and aldehyde, as individuals, along with water.

Consistent with this hypothesis is the observation that the distillate from the condenser undergoes a spontaneous rise in temperature, which may be attributed to the occurrence of an exothermic reaction between the freshly condensed methanol and aldehyde to form hemiacetal again.

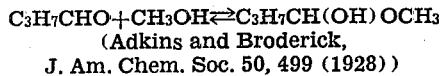

(Adkins and Broderick,
J. Am. Chem. Soc. 50, 499 (1928))

The present invention further resides in the discovery that the desired water-vapor concentration may be maintained at the top of the fractionating column if a low reflux ratio is preserved, preferably 1 to 1, or less, and not greater than 2 to 1, and the percent of water in the liquid at the bottom of the column is kept at not less than about 77.5% and, preferably in the neighborhood of 84%. It has also been found desirable to introduce the aqueous mixture of methanol and aldehyde into the fractionating column without preheating it so that its temperature is not above about 30° C.

The invention may be carried out satisfactorily by introducing an unheated aqueous mixture of not less than 20% methanol and a small proportion of butyraldehyde into a multiplate fractionating column at an intermediate plate thereof and introducing live steam at the bottom of the column to cause volatilization of the aqueous mixture, maintaining a reflux ratio of not more than about 1 to 1, and maintaining in the unvolatilized liquid at the bottom of the column a water content of about 84%.

The heat required to effect distillation may be furnished entirely or in part to the fractionating column by indirect means and the water necessary to maintain the required percentage of water in the tailings at the bottom of the column may be supplied entirely or in part by introducing water at the top of the column. If live steam is to be introduced at the bottom of the column in accordance with the preferred procedure, it follows that the steam will, at least in part, supply both the heat required for volatilizing the mixture and the additional water to maintain the required percentage of water in the tailings at the bottom of the column. The rate of introduction of live steam may be so regulated that no indirect heat or addition of water is required.

The invention will be further described with reference to the accompanying drawing wherein the single figure illustrates diagrammatically an apparatus designed for carrying out the process.

Referring to the drawing, a conventional multiplate fractionating column 11 is provided with a feed line 12, a liquid discharge line 13, a vapor discharge line 14 which leads to a condenser 15, an intake line 16 for steam, and an auxiliary feed line 17. The condenser 15 is provided with a line 20 leading to any suitable receiver (not shown) for the condensate. A trapped line 21 leading from the line 20 to the top of the column 11 is provided for returning condensate to the column 11. Regulation of the proportion of condensate returned to the column 11 and that led off to the receiver is effected by the valves 22 and 23 in the lines 20 and 21, respectively.

As shown in the drawing, the feed line 12 enters the fractionating column at an intermediate plate. It has been found that a column comprising 40 plates is suitable and with such a column it is preferred to have the feed line 12 enter above the twenty-second plate with the auxiliary feed line 17 entering above the fortieth plate. The precise number of plates in the fractionating column and the position of the lines with respect to the plates is not critical.

The liquid mixture to be separated, consisting essentially of methanol, butyraldehyde, and water, is introduced into the fractionating column 11 through the feed line 12. The heat required to effect distillation may be furnished to the column 11 by indirect means not shown in the drawing or, preferably, by live steam introduced through the line 16, or by both of these means jointly.

The maintenance of the requisite operating conditions in the column 11 is made possible by the provision of sufficient water. With feed mixtures of the compositions that ordinarily would be encountered, this is most advantageously accomplished by the introduction of live steam at the bottom of the column through the line 16, the steam furnishing both the needed water and the heat required for the distillation. It has been found that this method of heating is more efficient than indirect heating which, however, may be used instead or supplementarily. Also, it is practical to add water to the feed, or at the top of the column 11 through the line 17. Still another way of helping to maintain the desired content of water at the top of the column is to introduce part of the feed through the line 17.

The composition of the liquid at the bottom of the column may be watched for purposes of control of the operation by hydrometric readings of the tailings discharged or by observing the temperature of the liquid in the column. Under atmospheric pressure the boiling point of the limiting mixture of 77.5 parts of water with 22.5 parts of methanol is 85° C. Allowance for the effect of the slightly superatmospheric pressure within the column 11, and for the trifling factor of impurities in solution, alters its value somewhat but it is a simple matter for those skilled in the art to establish the temperature below which the liquid should not be allowed to fall. When pressure within the column is above atmospheric, an addition of 0.1° C. to the boiling point of the water-methanol mixtures should be made for each 10 mm. of mercury above 760 mm.

Persistent falling of the temperature of the liquid at the bottom of the column below the established temperature because of increased methanol concentration must be corrected by further application of one of the means already mentioned for maintaining the necessary content of water in the column, or by further decreasing the reflux ratio.

When the prescribed conditions of reflux ratio and of temperature at the bottom of the column are maintained, the aldehyde is carried to the top of the column and discharged therefrom as vapor through the line 14 to the condenser 15. The liquid collecting at the bottom of the column 11 and discharged therefrom through the line 13, contains substantially no aldehyde.

The reflux ratio herein referred to is the reflux ratio at the top of the column 11 above the point of feed. It is the ratio of the quantity of condensate from the condenser 15 which is returned through the line 21 to the top of the column 11, as compared to the quantity of the condensate which is taken off by the line 20 to the receiver. By insertion of rotameters in the lines 20 and 21, the proportion of condensate returned to the column 11 as compared to that going to the receiver is made constantly evident and the reflux ratio is readily adjusted simply by regulating the division of the condensate between the lines 20 and 21 through the manipulation of the valves 22 and 23.

Accompanying the vapor of butyraldehyde into the condenser 15 is steam in an amount approximately 10% of that of the butyraldehyde, and also vapor of methanol. A typical range of the distillate from the condenser 15 would be:

| | Per cent |
|---|---|
| Butyraldehyde | 2.3 to 62 |
| Water | 0.5 to 8 |
| Methanol | 97.2 to 30 |

Mixtures within the range above are suitable for reuse in the preparation of polyvinyl butyral resins.

The liquid collecting at the bottom of the column consists chiefly of methanol and water, in proportions governed by the procedure of the invention. That is, 22.5 parts of methanol to 77.5 parts or more of water, accompanied by minor percentages of non-volatile impurities which may be present in the feed liquor but such liquid is substantially free from butyraldehyde. These tailings from the column 11 are pumped through the line 13 to a rectifying column 18 in which, by known means, forming no part of the present invention, the methanol is recovered in pure and, if desired, substantially anhydrous condition.

Analysis of the tailings from the column 11 is likely to yield a false value for butyraldehyde content because of interference by non-volatile impurities. However, the operation of the column 18 in conventional manner for the rectification of the methanol will result in distillation of any butyraldehyde with the methanol and analysis of the distillate of methanol from the column 18 will show not more than traces of butyraldehyde, a few parts per million. This demonstrates the actual substantial absence of butyraldehyde from the tailings of the column 11.

The following example is given to illustrate a specific embodiment of the present invention:

*Example I.*—The feed liquor used in this example has the following composition:

| | |
|---|---|
| Methanol | 23.4 |
| n-Butyraldehyde | 0.3 |
| Water | 76.3 |
| | 100.0 |

The rectifying column used is one comprising 40 plates with the feed line 12 entering above the twenty-second plate. The feed liquor is introduced into the column 11 through the feed line 12 and live steam is introduced through the feed line 16 at the rate of 1500 pounds per 10,000 pounds of feed. The reflux ratio is maintained at pproximately 1 to 1 and the content of water at the bottom of the column is maintained at The condensate from vapors taken off through the vapor line 14 amounts to 88 pounds, per 10,000 pounds of feed, of the composition:

| | Parts |
|---|---|
| Methanol | 67 |
| n-Butyraldehyde | 30 |
| Water | 3 |

The tailings produced amount to 11,412 pounds, per 10,000 pounds of feed, of the composition:

| | |
|---|---|
| Methanol | 20 |
| Water | 80 |

The ingredients entering and yielded by the process balance as follows:

| | Furnished— | | Recovered— | |
|---|---|---|---|---|
| | In feed liquor | In live steam | In condensate | In tailings |
| Methanol | 2,341 | | 59 | 2,282 |
| n-Butyraldehyde | 26 | | 26 | |
| Water | 7,633 | 1,500 | 3 | 9,130 |
| | 10,000 | 1,500 | 88 | 11,412 |
| | 11,500 | | 11,500 | |

Analysis of the tailings shows an apparent content of aldehyde of about 20 parts per million, but this is a false indication resulting from the presence of interfering impurities. When the tailings are distilled for recovery of methanol, the condensate, now free from these non-volatile interfering substances, is found to contain aldehyde in amounts of only 1 to 2 P. P. M., which would correspond to 0.2 to 0.4 P. P. M. as the true content of the tailings.

It will be understood that the above example is merely illustrative and that the invention broadly comprises introducing an aqueous mixture of methanol and butyraldehyde into a fractionating column, applying heat to volatilize the mixture, and maintaining a water-vapor concentration of at least about 10% by weight of the butyraldehyde vapor at the top of the column.

Any type of fractionating column may be used, although a multiplate column has been found most practical. Although not ordinarily as efficient, even a packed tower could be used. Several alternative means of maintaining the requisite vapor concentration at the top of the fractionating column have been disclosed and, of course, still other means of maintaining the required vapor concentration may be employed. While the present invention is applicable to aqueous mixtures of methanol and butyraldehyde generally, it is of greatest advantage, economically speaking, when the mixture contains at least 20% of methanol although it is economically justified when the mixture contains as little as 10% of methanol.

An advantage of the present invention is that it provides a practical and economical method of separating methanol, uncontaminated by butyraldehyde, from a mixture of methanol, water, and butyraldehyde, either the normal or iso-butyraldehyde, and of recovering the aldehyde in usable concentrations in the form of a mixture with about 10% of its weight of water and with some methanol.

The invention is of particular advantage as operated in connection with the manufacture of polyvinyl resins because it affords an economical way of recovering aldehyde and methanol from waste liquors derived from the process of making the resins, and of delivering them in forms suitable for reuse.

As many apparently widely different embodiments of this invention may be made without departing from the spirit and scope thereof, it is to be understood that the invention is not limited to the specific embodiments thereof except as defined in the appended claims.

We claim:
1. Process of separating from an aqueous mixture of methanol and butyraldehyde, a mixture of methanol and water substantially free from butyraldehyde, and a mixture of methanol, butyraldehyde, and water containing substantially all of the butyraldehyde contained in said original mixture, which process comprises introducing said original mixture into a fractionating column at an intermediate point thereof, applying heat at the bottom of said column to volatilize said original mixture, maintaining a reflux ratio of less than about 2:1 at the top of said column, introducing water, in excess of the water contained in said original mixture, into said fractionating column to the extent necessary to maintain a water content of at least 77.5% in the liquid at the bottom of said column, and maintaining a water vapor concentration of about 7% to 15% by weight of the butyraldehyde vapor at the top of said column.

2. Process of separating from an aqueous mixture of methanol and butyraldehyde, a mixture of methanol and water substantially free from butyraldehyde, and a mixture of methanol, butyraldehyde, and water containing substantially all of the butyraldehyde contained in said original mixture, which process comprises introducing said original mixture into a fractionating column at an intermediate point thereof, applying heat at the bottom of said column to volatilize said original mixture, maintaining a reflux ratio of about 1:1 at the top of said column, introducing water, in excess of the water contained in said original mixture, into said fractionating column to the extent necessary to maintain a water content of about 84% in the liquid at the bottom of said column, and maintaining a water vapor concentration of about 7% to 15% by weight of the butyraldehyde vapor at the top of said column.

3. Process of separating from an aqueous mixture of methanol and butyraldehyde, a mixture of methanol and water substantially free from butyraldehyde, and a mixture of methanol, butyraldehyde, and water containing substantially all of the butyraldehyde contained in said original mixture, which process comprises introducing said original mixture into a multiplate fractionating column at an intermediate plate thereof, introducing live steam at the bottom of said column to volatilize said original mixture, maintaining a reflux ratio of less than about 2:1 at the top of said column, introducing water, in excess of the water contained in said original mixture, into said fractionating column to the extent necessary to maintain a water content of at least 77.5% in the liquid at the bottom of said column, and maintaining a water vapor concentration of about 7% to 15% by weight of the butyraldehyde vapor at the top of said column.

4. Process of separating from an aqueous mixture of methanol and butyraldehyde, a mixture of methanol and water substantially free from butyraldehyde, and a mixture of methanol, butyraldehyde, and water containing substantially all of the butyraldehyde contained in said original mixture, which process comprises introducing said original mixture into a fractionating column at an intermediate point thereof, applying heat at the bottom of said column to volatilize said original mixture, maintaining a reflux ratio of less than about 2:1 at the top of said column, increasing the water content of said original mixture to the extent necessary to maintain a water content of at least 77.5% in the liquid at the bottom of said column, and maintaining a water vapor concentration of about 7% to 15% by weight of the butyraldehyde vapor at the top of said column.

JOHN H. HOPKINS.
BARNARD M. MARKS.

CERTIFICATE OF CORRECTION.

Patent No. 2,321,748.　　　　　　　　　　　　　　　　　　　June 15, 1943.

JOHN H. HOPKINS, ET AL.

It is hereby certified that error appears in the printed specification of the above numbered patent requiring correction as follows: Page 3, first column, line 61, Example 1, for "pproximately" read --approximately--; line 62, after the word "at" second occurrence, insert --80%.--; and that the said Letters Patent should be read with this correction therein that the same may conform to the record of the case in the Patent Office.

Signed and sealed this 27th day of July, A. D. 1943.

(Seal)　　　　　　　　　　　　　　　　　　　　　　　　　Henry Van Arsdale,
　　　　　　　　　　　　　　　　　　　　　　　　　　Acting Commissioner of Patents.